United States Patent
Gasparik

[19]

[11] Patent Number: 6,157,974
[45] Date of Patent: Dec. 5, 2000

[54] HOT PLUGGING SYSTEM WHICH PRECHARGING DATA SIGNAL PINS TO THE REFERENCE VOLTAGE THAT WAS GENERATED FROM VOLTAGE DETECTED ON THE OPERATING MODE SIGNAL CONDUCTOR IN THE BUS

[75] Inventor: Frank Gasparik, Monument, Colo.

[73] Assignee: LSI Logic Corporation, Milpitas, Calif.

[21] Appl. No.: 08/996,841

[22] Filed: Dec. 23, 1997

[51] Int. Cl.$^7$ ........................................... G06F 13/00
[52] U.S. Cl. ............................. 710/103; 710/102
[58] Field of Search ....................... 712/1; 710/103, 710/102

[56] References Cited

U.S. PATENT DOCUMENTS

| | | | |
|---|---|---|---|
| 5,210,855 | 5/1993 | Bartol | 395/500 |
| 5,268,592 | 12/1993 | Bellany et al. | 307/43 |
| 5,432,916 | 7/1995 | Hahn et al. | 710/103 |
| 5,473,499 | 12/1995 | Weir | 361/58 |
| 5,515,515 | 5/1996 | Kennedy et al. | 395/283 |
| 5,530,810 | 6/1996 | Bowman | 710/103 |
| 5,568,610 | 10/1996 | Brown | 714/48 |
| 5,572,395 | 11/1996 | Rasums et al. | 361/58 |
| 5,579,491 | 11/1996 | Jeffries et al. | 395/283 |
| 5,604,873 | 2/1997 | Fite et al. | 395/283 |
| 5,625,593 | 4/1997 | Kimura | 365/189.05 |
| 5,634,132 | 5/1997 | Pearce et al. | 326/80 |
| 5,668,770 | 9/1997 | Itoh et al. | 365/227 |
| 5,726,592 | 3/1998 | Schulte et al. | 327/65 |
| 5,784,576 | 7/1998 | Guthrie et al. | 710/103 |

FOREIGN PATENT DOCUMENTS

WO 99/24908  5/1999  WIPO .

OTHER PUBLICATIONS

XP 000586553—Author(s)—Filliter et al.

*Primary Examiner*—Meng-Ai T. An
*Assistant Examiner*—Mackly Monestime

[57] ABSTRACT

Data signal pins for a peripheral device are adaptively precharged during hot plugging to a voltage level depending on both the mode of operation (low voltage differential, high voltage differential, or single ended) and the actual signal voltages being employed for a particular mode. An active terminator bus provides an operating mode sensing signal, from which the operating mode of the bus and the actual signal voltage levels being employed may be determined. Signal pins on an edge connector for the device are connected, in sequence, to the corresponding ground, power supply, operating mode sensing signal, and data signal conductors of the bus. During the gap in time between connection of non-data signal pins (ground, power supply, and operating mode sensing pins) of the edge connector to the corresponding bus conductors and connection of the data signal pins while hot plugging, the precharge voltage level is generated on-board the peripheral device from the actual signal voltage levels being employed on the bus, and the data signal pins are precharged. The precharge voltage level is centered between the differential signal voltage levels for differential operating modes and centered between the hysteresis trip points for single ended operation modes. By precharging the parasitic capacitances of the data signal pins on the device to this voltage level, signal voltage levels on bus conductors are drawn toward this voltage level without changing the polarity of a differential signal or crossing a hysteresis trip point for a single ended signal.

27 Claims, 2 Drawing Sheets

$V_{REF} = +1.25V$
$|V_N - V_A| \leq 400mV$ $V_{REF} = +1.25V$
$|V_N - V_A| \leq 400mV$

HOT PLUGGING SYSTEM WHICH PRECHARGING DATA SIGNAL PINS TO THE REFERENCE VOLTAGE THAT WAS GENERATED FROM VOLTAGE DETECTED ON THE OPERATING MODE SIGNAL CONDUCTOR IN THE BUS

BACKGROUND OF THE INVENTION

1. Technical Field

The present invention relates generally to hot plugging of peripheral devices and in particular to hot plugging peripheral devices to a bus operating selectively in low voltage differential mode, high voltage differential mode, or single-ended mode. Still more particularly, the present invention relates to preserving the integrity of data signals through adaptable precharging when hot plugging a peripheral device to a bus operating in a selectable transmission mode.

2. Description of the Related Art

Many modern data processing employ buses conforming to the small computer system interface (SCSI) standard to connect disk drives or redundant array of inexpensive disk (RAID) devices to a system bus. The replacement of peripheral devices, such as disk drives in personal computers or RAID boxes, connected to a SCSI bus during a data transfer on that bus is called "hot plugging." Since the device being connected to the bus is normally without power, external pins in the device represent discharged capacitors. At the instant when the pin comes in contact with a transmission line within the bus (a bus conductor), the pin capacitor will act as an ideal short to ground. This will disrupt the signal level at the instant of connection, which may cause an interruption of the data transfer.

An example of the problem caused by hot plugging peripheral devices to a SCSI bus is depicted in FIG. 6. The example depicted relates to low voltage differential (LVD) transmission in a SCSI environment, in which a differential signal between a pair of cable wires carrying two signals $V_N$ and $V_A$, centered around a reference voltage $V_{REF}$ of approximately 1.25 V, has a magnitude which is typically about 400 mVpp (millivolts, peak-to-peak). At a time $t_1$, a peripheral device pin makes contact with the cable connector and pulls the signal level to ground. The differential signal $V_N$–$V_A$ changes polarity, which may be interpreted by the receiver as an ordinary data transition, resulting in a data transfer error.

The prior art typically addresses the problems associated with hot plugging after the fact, by re-transmission of data after the interruption. However, the standard SCSI connector SCA-2 provides a mechanical means, through pins of different lengths, for connecting the ground and power supply bus conductors to the corresponding signal pins on the SCSI board or other peripheral device before the data signal conductors are connected to the corresponding data signal pins. This mechanism may be employed, as suggested in the prior art, to precharge the signal pins on a SCSI card during hot plugging. Typically, however, such precharging is concerned with power surges during hot plugging and not with preserving data integrity. Therefore, most conventional precharging schemes propose precharging the pins to a fixed, predefined voltage to limit current and power consumption during hot plugging.

Precharging pins to a fixed, predefined voltage may limit current consumption during hot-plugging but does not necessarily preserve data integrity since actual signal voltages during operation are not fixed and may vary across a wide range defined tolerances. In the case of LVD SCSI, for instance, the actual reference voltage $V_{REF}$ around which the data signals $V_N$ and $V_A$ are centered may vary from 0.7 V to 1.8 V, with the typical value being 1.25 V. The tolerance for the reference voltage $V_{REF}$ is thus more than twice the magnitude of the differential signal $|V_N-V_A|\leq 400$ mV. Any predefined precharge voltage having a constant or fixed value will not necessarily prevent changes in the differential signal which may being interpreted by a receiver as a data transition.

Additionally, some devices are designed to selectively operate in more than one transmission mode. A single device, such as the Symbios Model 53C895 Universal Transceiver available from Symbios, Inc. of Fort Collins, Colo., may be configured to operate in either the LVD SCSI mode, the high voltage differential SCSI mode, or the single ended (SE) SCSI mode, depending on the transmission mode of the bus to which the device is connected. The different transmission modes employ different voltages and voltage ranges. For example, LVD SCSI employs a differential signal centered on a reference signal somewhere in the range of 0.7 V to 1.8 V, as noted above, which SE SCSI employs a voltage swing of 0 V to 3.3 V.

Even the single ended SCSI transmission mode is sensitive to data signal fluctuations during hot-plugging. SE SCSI signals swing from $V_{SS}$ to $V_{TERM}$, as defined by the external terminator and loaded bus. To improve noise immunity, the front-end of an SE SCSI receiver may be implemented in the form of a Schmitt Trigger with hysteresis centered around the TTL trip point of 1.4 V. Thus, for a typical hysteresis window of about ±150 mV, the trip point is 1.55 V for the positive signal transition and 1.25 V for the negative signal transition. Fluctuations of the data signal conductor voltages during hot-plugging may cross these trip points. The hysteresis may also be variable. Therefore, a fixed precharge voltage will not suffice to preserve data integrity.

It would be desirable, therefore, to provide adaptable precharging of data signal pins based on actual operating voltages for preservation of data integrity. It would further be advantageous for the adaptable precharging to automatically accommodate any of several selectable transmission modes.

SUMMARY OF THE INVENTION

Data signal pins for a peripheral device are adaptively precharged during hot plugging to a voltage level depending on both the mode of operation (low voltage differential, high voltage differential, or single ended) and the actual signal voltages being employed for a particular mode of operation. An active terminator on the bus provides an operating mode sensing signal from which the operating mode of the bus may be determined. The operating mode sensing signal also provides an indication of the actual signal voltage levels being employed, from which the voltage level for precharging of data signal pins on the peripheral device may be generated. Signal pins on an edge connector for the device are connected, in sequence, to the corresponding ground, power supply, operating mode sensing signal, and data signal conductors of the bus. During the gap in time between connection of ground, power supply, and operating mode sensing pins of the edge connector to the corresponding bus conductors and connection of the data signal pins while hot plugging, the voltage level to be employed for precharging is generated on-board the peripheral device and the data signal pins are precharged. The precharge voltage level is centered between the differential signal voltage levels for differential operating modes and centered between the hysteresis trip points for single ended operation modes. By precharging the parasitic capacitances of the data signal pins on the device to this voltage level, signal voltage levels on bus conductors are drawn toward this voltage level without changing the polarity of a differential signal or crossing a hysteresis trip point for a single ended signal. Data integrity is thus preserved during hot plugging.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
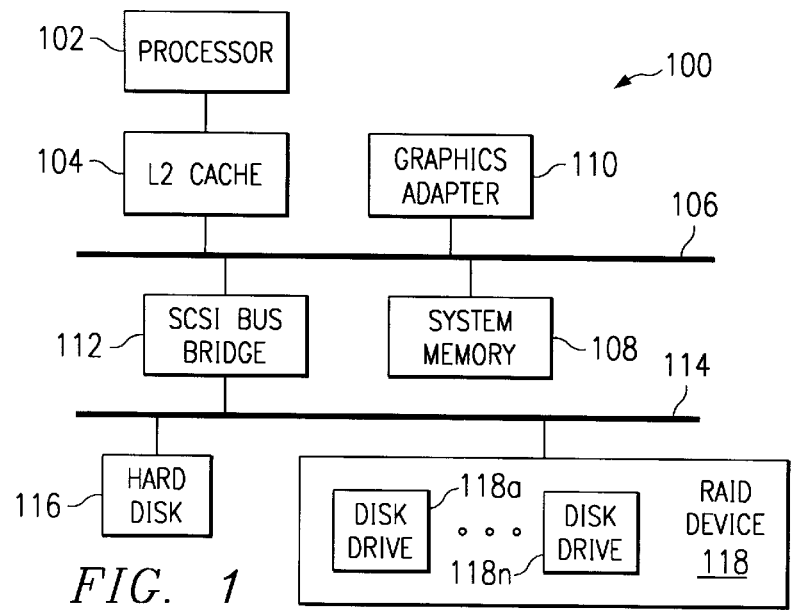
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 includes a processor 102 connected to a level two (L2) cache 104, which is connected in turn to a system bus 106. Memory 108 in the depicted example is also connected to system bus 106, as is memory-mapped graphics adapter 110, which is further connected to a display device (not shown).

Also connected to system bus 106 is a SCSI bus bridge 112 providing a connection between system bus 106 and SCSI bus 114. SCSI bus 112 is connected to hard disk drive 116 and to RAID device 118 including a plurality of disk drives 118a–118n in accordance with the known art. The embodiment depicted in FIG. 1 is presented merely for the purposes of explaining the invention and is not intended to imply architectural limitations. Those skilled in the art will recognize that many variants of the embodiment depicted may be utilized in connection with the present invention. However, devices connected to SCSI bus 114 include a mechanism for adaptive precharging of data signal pins during hot plugging as described in greater detail below.

Figure 2:
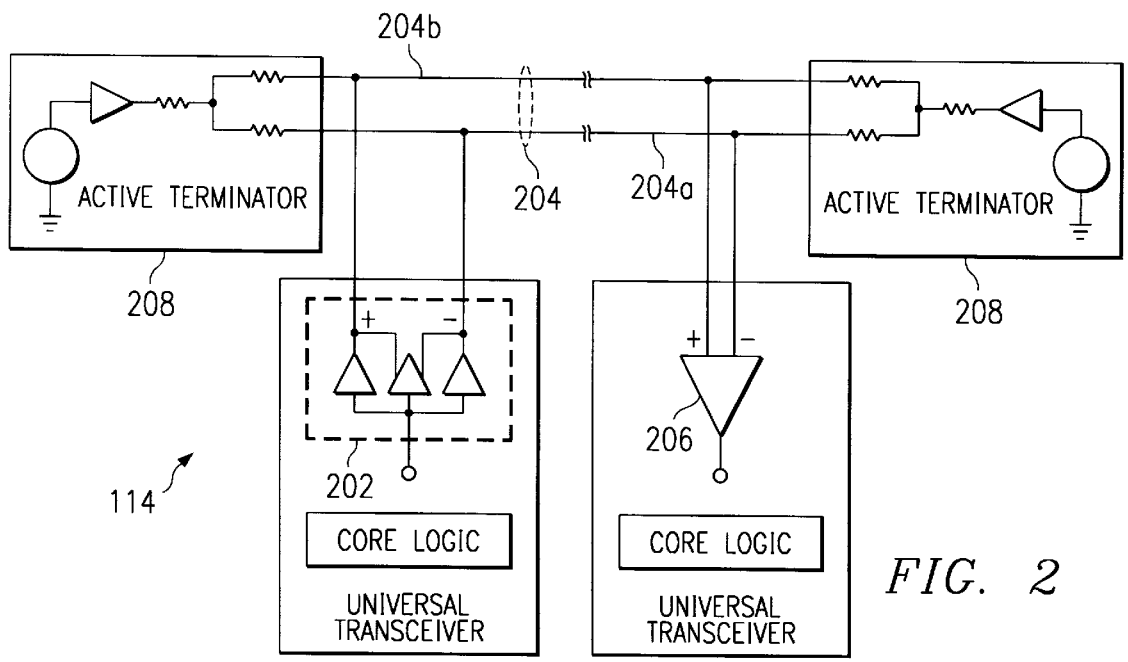
FIG. 2 is a circuit diagram of a SCSI bus employing adaptive precharging in accordance with a preferred embodiment of the present invention.

Referring to FIG. 2, a circuit diagram of a SCSI bus employing adaptive precharging in accordance with a preferred embodiment of the present invention is illustrated. Driver 202 drives SCSI cable 204 to transmit signals to receiver 206. SCSI cable 204 in the depicted embodiment includes two conductors 204a and 204b carrying complementary portions of the differential signal. SCSI cable 204 is terminated with an active terminators 208, such as a Unitrode model UC5630 27-line SCSI Source/Sink Regulator.

Figure 2A:
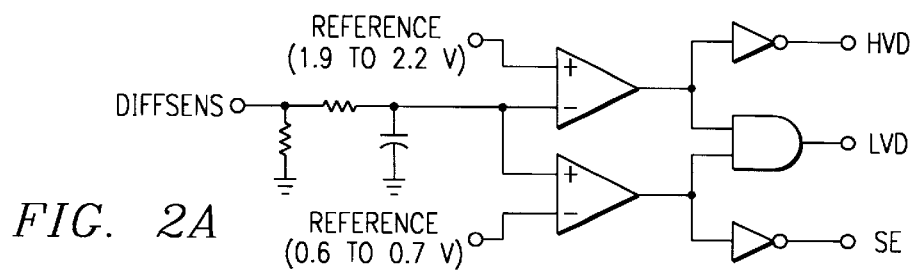

Active terminator 208 provides an operating mode sensing signal DIFFSENS (not shown) indicating the mode of operation. For LVD SCSI operation, the DIFFSENS voltage is from 0.7 V to 1.9 V; for HVD SCSI operation, the DIFFSENS voltage is from 2.4 V to $V_{DD}$+0.3 V (greater than 2.4 V); and for SE SCSI operation, the DIFFSENS voltage is from $V_{SS}$–0.3 V to 0.5 V (less than 0.5 V). The actual DIFFSENS voltage may vary within the defined ranges, depending on the actual operating voltages. The value of the actual DIFFSENS signal and the three voltage ranges defined for different modes of operation are employed during hot plugging of a peripheral device to recognize the SCSI mode of operation and to generate the data signal precharge voltage, as described below. A simple circuit for determining the operating mode of a SCSI bus during hot-plugging is shown in FIG. 2A.

Figure 3:
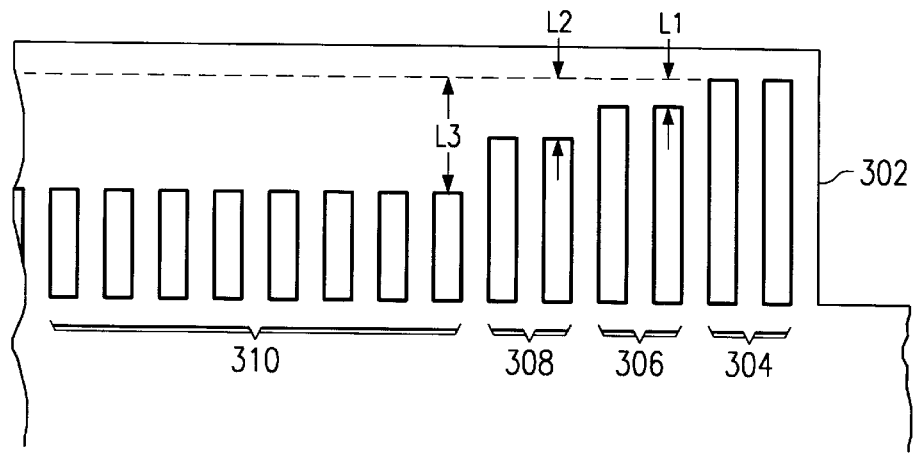
FIG. 3 depicts a pictorial representation of an edge connector for device which employs adaptive precharging of data signal pins during hot plugging in accordance with a preferred embodiment of the present invention.

With reference now to FIG. 3, a pictorial representation of an edge connector for device which employs adaptive precharging of data signal pins during hot plugging in accordance with a preferred embodiment of the present invention is illustrated. The edge connector 302 of a peripheral device supporting hot plugging includes a signal pins of varying lengths. The longest are ground pins 304, followed by power pins 306, DIFFSENS signal pins 308, and data signal pins 310. This allows for sequential connection of grounds pins 304, power pins 306, DIFFSENS signal pins 308, and data signal pins 310, in that order, during hot plugging. During the period of time between connection of non-data signal pins (including ground pins 304, power pins 306, and DIFFSENS signal pins 308) to the bus and connection of data signal pins 310 to the bus, data signal pins 310 are precharged as described in further detail below. DIFFSENS pins 308 are driven like power pins 306, with low impedance voltage source and capable of tolerating hot plugging of a 0.1 µF filter capacitor, as compared to a maximum capacitance of 20 pF for data signal pins 310.

Figure 4:
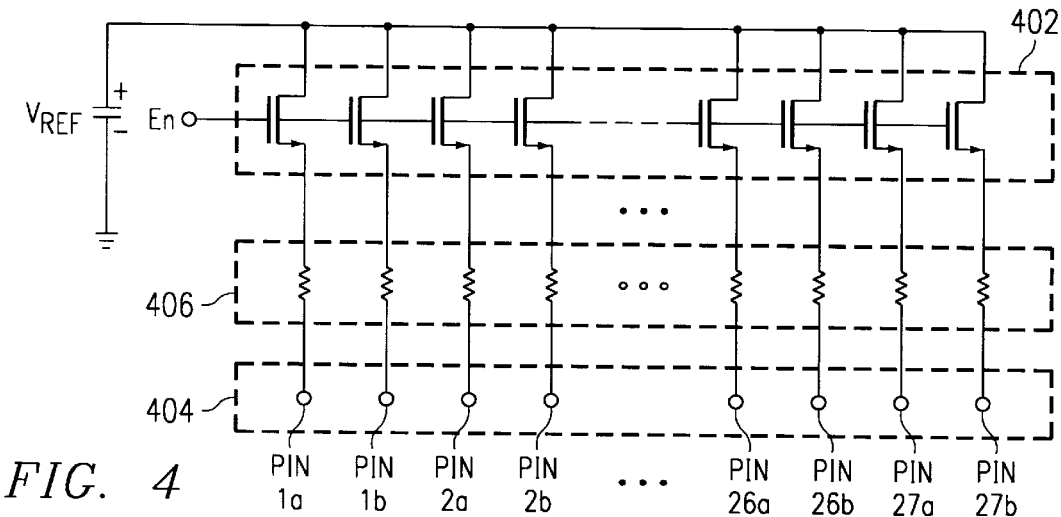
FIG. 4 is a circuit diagram for a circuit providing adaptive precharging of data signal pins on a SCSI bus connector in accordance with a preferred embodiment of the present invention.

Referring to FIG. 4, a circuit diagram for a circuit providing adaptive precharging of data signal pins on a SCSI bus connector in accordance with a preferred embodiment of the present invention is depicted. A voltage $V_{REF}$ is provided, adaptively generated from the DIFFSENS voltage supplied by the active terminator. For LVD mode buses, $V_{REF}$ should be approximately 1.25 V. For SE mode buses, $V_{REF}$ should be approximately 1.4 V. A multiplexer-type device (not shown) may be employed to select a voltage source having the appropriate voltage level for the operating mode determined from the DIFFSENS voltage, with the DIFFSENS voltage level being employed to adjust the output voltage of the selected voltage source to the actual voltage level being employed.

A plurality of MOS switches 402 connect voltage $V_{REF}$ to the data signal pins 404 of the peripheral device being connected to the bus. All pins on the peripheral device other than the ground, power supply, and DIFFSENS pins are connected to $V_{REF}$ by MOS switches 402. Resistors 406, having a resistance of approximately 1 KΩ or an other suitable value for specific implementations, are connected between the MOS switches and the pin connections.

Switches 402 are controlled by enable signal En, which may be derived from the power-on-reset signal of the peripheral device connected to the bus by hot plugging. Once asserted, enable signal En may be maintained in an asserted state for a predefined period corresponding to the time required to complete insertion. Alternatively, enable signal En may be deasserted as a result of detecting data signals from the bus through one or more of the data signal pins on the peripheral device, indicating that the peripheral device is completely connected to the bus.

Figure 5:
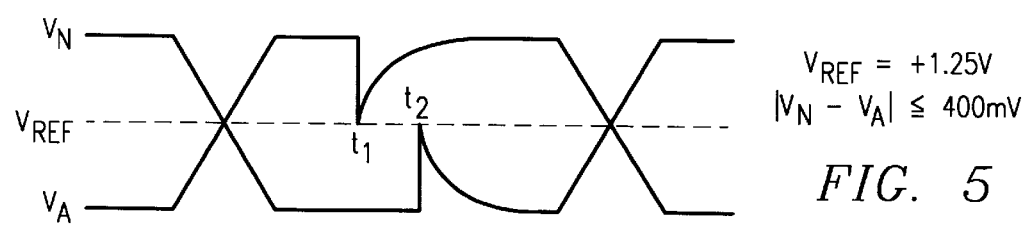
FIG. 5 is a timing diagram for hot plugging a device within a low voltage differential (LVD) SCSI bus employing adaptive precharging of data signal pins in accordance with a preferred embodiment of the present invention.
Figure 6:
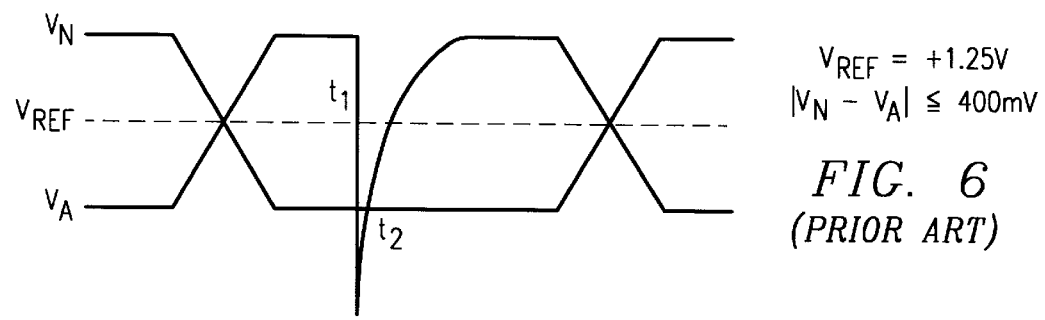
FIG. 6 is a timing diagram of hot plugging a device within an LVD SCSI bus without precharging.

With reference now to FIG. 5, a timing diagram for hot plugging a device within an LVD SCSI bus employing adaptive precharging of data signal pins in accordance with a preferred embodiment of the present invention is illustrated. During hot plugging of a peripheral device, the connection of ground, power supply, and operating mode sensing pins of the device to the corresponding bus conductors is employed to precharge the data signal pins. The power supply voltage is employed to generate a voltage level on-board the peripheral device equal to the actual reference voltage being employed by the bus. Each data signal pin is connected to this voltage level for a period of time needed to charge the parasitic capacitance associated with these data signal pins. For differential modes of operation, the data signal pins are precharged to a reference voltage $V_{REF}$ centered between the actual voltages being employed for differential signals $V_N$ and $V_A$. For the single ended mode of operation, the data signal pins are precharged to the reference voltage $V_{REF}$ centered between the hysteresis trip points.

As a result of precharging the data signal pins to the reference voltage, during hot plugging both the $V_N$ and $V_A$ signals on the data signal bus conductors will be pulled toward the reference voltage $V_{REF}$ at the time of connection of the data signal pins. The variations of $V_N$ and $V_A$ when precharged data signal pins are connected to corresponding bus conductors will be in opposite directions but similar magnitudes. The magnitudes of variations in $V_N$ and $V_A$ will be less than the full differential voltage range of the operating mode, preventing any receiving device from interpreting the variations as a change in polarity or a data transition and preserving data integrity.

Due to differences in device speeds, these variations in $V_N$ and $V_A$ may occur at different times $t_1$ and $t_2$ as depicted. However, even in the worst case where the variations occur at times $t_1$ and $t_2$ spaced far apart, a polarity change of the differential signal will not occur.

The present invention provides adaptive precharging of data signal pins on a peripheral device during hot plugging depending both on the bus operating mode and the actual signal voltage levels being employed within the defined tolerances of a particular operating mode. An operating mode sensing signal provided by an active terminator on the bus is utilized to generate the voltage level to which the data signal pins are precharged.

Signal pins on an edge connector for the peripheral device are connected, in sequence, to the corresponding ground, power supply, operating mode sensing signal, and data signal conductors of the bus. During the gap in time between connection of ground, power supply, and operating mode sensing pins of the edge connector to the corresponding bus conductors and connection of the data signal pins while hot plugging, the voltage level to be employed for precharging is generated on-board the peripheral device and the data signal pins are precharged for a period of time required to charge the associated parasitic capacitance. The precharge voltage is centered between the differential signal voltage levels for differential operating modes and centered between the hysteresis trip points for single ended operation modes.

By precharging the parasitic capacitances of the data signal pins on the peripheral device to this voltage level during hot plugging, signal voltage levels on bus conductors are drawn toward this voltage level without changing the polarity of a differential signal or crossing a hysteresis trip point for a single ended signal. Such changes in polarity or crossing of hysteresis trip points may be mistakenly interpreted as ordinary data transitions by a receiving device, particularly for high speed buses. Thus, adaptive precharging in accordance with the present invention preserves data integrity during hot plugging.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of preserving data integrity while hot plugging a peripheral device, comprising:

connecting ground, power supply, and operating mode signal pins on the peripheral device to corresponding ground, power supply, and operating mode signal conductors in a bus;

generating a reference voltage from a voltage detected on the operating mode signal conductor in the bus; and precharging data signal pins on the peripheral device to the reference voltage before connecting the data signal pins to corresponding data signal conductors in the bus.

2. The method of claim 1, wherein the step of connecting ground, power supply, and operating mode signal pins on the peripheral device to corresponding ground, power supply, and operating mode signal conductors in a bus further comprises:

sequentially connecting the ground pin to the ground conductor, the power supply pin to the power supply conductor, and the operating mode signal pin to the operating mode signal conductor.

3. The method of claim 1, wherein the step of precharging data signal pins on the peripheral device to the reference voltage before connecting the data signal pins to corresponding data signal conductors in the bus further comprises:

connecting the data signal pins on the peripheral device to the reference voltage for a period of time sufficient to charge a capacitance associated with the data signal pins; and connecting the charged data signal pins to the corresponding data signal conductors in the bus.

4. A method of preserving data integrity while hot plugging a peripheral device, comprising:

connecting ground, power supply, and operating mode signal pins on the peripheral device to corresponding ground, power supply and operating mode signal conductors in a bus; and generating a reference voltage from a voltage detected on the operating mode signal conductor in the bus;

precharging data signal pins on the peripheral device to the reference voltage before connecting the data signal pins to corresponding data signal conductors in the bus, wherein the step of generating a reference voltage from a voltage detected on the operating mode signal conductor in the bus further comprises:

determining an operating mode of the bus from the voltage detected on the operating mode signal conductor; and selecting a voltage level corresponding to the detected operating mode for the reference voltage.

5. The method of claim 4, wherein the step of generating a reference voltage from a voltage detected on the operating mode signal conductor in the bus further comprises:

adjusting the selected voltage level to a level which is substantially equal an actual voltage level detected on a bus conductor.

6. The method of claim 4, wherein the step of selecting a voltage level corresponding to the detected operating mode for the reference voltage further comprises:

responsive to detecting a low voltage differential mode of operation on the bus, selecting a first voltage source having a first voltage output level;

responsive to detecting a high voltage differential mode of operation on the bus, selecting a second voltage source having a second voltage output level different from the first voltage output level; and responsive to detecting a single ended mode of operation on the bus, selecting a third voltage source having a third voltage output level different from the first and second voltage output levels.

7. A method of adaptively precharging signal pins for hot plugging a peripheral device without disrupting a data transfer on a bus, comprising:

connecting ground and power supply pins on the peripheral device to corresponding ground and power supply bus conductors;

generating a precharge voltage from an actual voltage detected on a bus conductor;

connecting data signal pins on the peripheral device to the precharge voltage for a period of time sufficient to charge a capacitance associated with the data signal pins; and connecting the charged data signal pins to corresponding data signal conductors in the bus.

8. The method of claim 7, wherein the precharge voltage is a voltage centered between signal voltages for a differential signal.

9. The method of claim 7, wherein the precharge voltage is approximately 1.25 V.

10. The method of claim 7, wherein the precharge voltage is a voltage centered between hysteresis trip points for a single ended signal.

11. The method of claim 7, wherein the precharge voltage is approximately 1.4 V.

12. An peripheral device suitable for hot plugging, comprising:

an edge connector having a ground pin, a power supply pin, an operating mode signal pin, and at least one data signal pin, wherein the ground, power supply, and operating mode signal pins extend closer to an edge of the edge connector than the at least one data signal pin, wherein the ground, power supply, and operating mode signal pins contact corresponding ground, power supply, and operating mode signal conductors for a bus before the at least one data signal pin contacts a corresponding data signal conductor for the bus during insertion of the edge connector into a slot for the bus;

a reference voltage generated from a voltage detected on the operating mode signal conductor for the bus; and a precharge circuit connecting the at least one data signal pin on the peripheral device to the reference voltage before connecting the at least one data signal pin to the corresponding data signal conductor for the bus.

13. The peripheral device of claim 12, wherein the ground pin extends closer to the edge of the edge connector than the power supply pin and the power supply pin extends closer to the edge of the edge connector than the operating mode signal pin, and wherein the ground, power supply and operating mode signal pins are sequentially connected to the corresponding ground, power supply, and operating mode signal conductors for the bus during insertion of the peripheral device into the slot for the bus.

14. The peripheral device of claim 12, wherein the precharge circuit further comprises:

switches connecting the data signal pins on the peripheral device to the reference voltage for a period of time sufficient to charge a capacitance associated with the data signal pins.

15. A peripheral device suitable for hot plugging comprising:

an edge connector having a ground pin, a power supply pin, an operating mode signal pin, and at least one data signal pin, wherein the ground, power supply, and operating mode signal pins extend closer to an edge of the edge connector than the at least one data signal pin, wherein the ground, power supply, and operating mode signal conductors for a bus before the at least one data signal pin contacts a corresponding data signal conductor for the bus during insertion of the edge connector into a slot for the bus;

a reference voltage generated from a voltage detected on the operating mode signal conductor for the bus; and a precharge circuit connecting the at least one data signal pin on the peripheral device to the reference voltage before connecting the at least one data signal pin to the corresponding data signal conductor for the bus, wherein the reference voltage is selected to correspond to an operating mode of the bus determined from a voltage detected on the operating mode signal conductor.

16. The peripheral device of claim 15, wherein the reference voltage is substantially equal to an actual voltage detected on a bus conductor.

17. The peripheral device of claim 15, wherein the reference voltage further comprises:

a first voltage level selected if a low voltage differential mode of operation is detected on the bus;

a second voltage level different from the first voltage level selected if a high voltage differential mode of operation is detected on the bus; and a third voltage level different from the first and second voltage levels selected if a single ended mode of operation is detected on the bus.

18. An apparatus for adaptively precharging signal pins while hot plugging a peripheral device, comprising:

means for connecting ground and power supply pins on the peripheral device to corresponding ground and power supply bus conductors;

means for generating a precharge voltage from an actual voltage detected on a bus conductor;

means for connecting data signal pins on the peripheral device to the precharge voltage for a period of time sufficient to charge a capacitance associated with the data signal pins; and means for connecting the charged data signal pins to corresponding data signal conductors in the bus.

19. The apparatus of claim 18, wherein the precharge voltage is a voltage centered between signal voltages for a differential signal.

20. The apparatus of claim 18, wherein the precharge voltage is approximately 1.25 V.

21. The apparatus of claim 18, wherein the precharge voltage is a voltage centered between hysteresis trip points for a single ended signal.

22. The apparatus of claim 18, wherein the precharge voltage is approximately 1.4 V.

23. A data processing system including adaptive precharging of peripheral device signal pins during hot plugging, comprising:
   a processor;
   a bus connected to the processor, the bus including at least one slot for receiving a peripheral, the bus including a ground conductor, a power supply conductor, an operating mode signal conductor, and a data signal conductor;
   a peripheral device, the peripheral device including:
      a ground pin;
      a power supply pin;
      an operating mode signal pin;
      a data signal pin, wherein the data signal pin contacts the data signal conductor after at least one other pin contacts a corresponding conductor during insertion of the peripheral device into the bus slot; and
      a precharge circuit detecting a voltage on the operating mode signal conductor during insertion of the peripheral device into the bus slot and charging the data signal pin to a reference voltage corresponding to the detected voltage.

24. The data processing system of claim 23, wherein the operating mode signal pin contacts the operating mode signal conductor prior to the data signal pin contacting the data signal conductor during insertion of the peripheral device into the bus slot.

25. The data processing system of claim 23, wherein the reference voltage is centered between two signal voltages employed for low voltage differential signaling on the data signal conductor.

26. The data processing system of claim 23, wherein the reference voltage is centered between two signal voltages employed for high voltage differential signaling on the data signal conductor.

27. The data processing system of claim 23, wherein the reference voltage is centered between two trip points employed for single ended signaling on the data signal conductor.

* * * * *